United States Patent
Weng (10) Patent No.: US 9,268,360 B2
(45) Date of Patent: Feb. 23, 2016

(54) APPARATUS FOR AND METHOD OF SCREWLESS ASSEMBLY AND ADJUSTABLE DAMPING STRUCTURE FOR PANEL STRESS RELIEF

(75) Inventor: Chung-Kuo Weng, Xizhi (TW)

(73) Assignee: Flextronics AP, LLC, Broomfield, CO (US)

(*) Notice: Subject to any disclaimer, the term of this patent is extended or adjusted under 35 U.S.C. 154(b) by 278 days.

(21) Appl. No.: 12/627,938

(22) Filed: Nov. 30, 2009

(65) Prior Publication Data

US 2011/0128696 A1 Jun. 2, 2011

(51) Int. Cl.
*G06F 1/16* (2006.01)
*G11B 33/08* (2006.01)
*G11B 33/12* (2006.01)

(52) U.S. Cl.
CPC .......... *G06F 1/1616* (2013.01); *G06F 1/1637* (2013.01); *G11B 33/08* (2013.01); *G11B 33/124* (2013.01)

(58) Field of Classification Search
CPC .............................. G06F 1/1616; G06F 1/1637
USPC ............... 361/679.21–679.3, 679.33–679.39, 361/679.41; 349/58–60; 313/582
See application file for complete search history.

(56) References Cited

U.S. PATENT DOCUMENTS

| | | |
|---|---|---|
| 4,476,606 A | 10/1984 | Bjorkman et al. |
| 4,542,924 A | 9/1985 | Brown et al. |
| 5,682,291 A | 10/1997 | Jeffries et al. |
| 5,946,061 A * | 8/1999 | Kurihara et al. ............... 349/58 |
| 6,002,658 A | 12/1999 | Aso et al. |
| 6,151,207 A * | 11/2000 | Kim .......................... 361/679.26 |
| 6,310,769 B1 | 10/2001 | Johnson et al. |
| 6,377,447 B1 | 4/2002 | Boe |
| 6,377,449 B1 | 4/2002 | Liao et al. |
| 6,411,501 B1 * | 6/2002 | Cho et al. ................. 361/679.27 |
| 6,501,641 B1 * | 12/2002 | Kim et al. ................. 361/679.27 |
| 6,560,092 B2 * | 5/2003 | Itou et al. ................. 361/679.55 |
| 6,590,848 B1 | 7/2003 | Chen |
| 6,614,654 B2 | 9/2003 | Liu et al. |
| 6,619,766 B1 | 9/2003 | Mansueto |
| 6,652,314 B2 * | 11/2003 | Tournadre ..................... 439/536 |
| 6,661,652 B2 | 12/2003 | Worden et al. |
| 6,728,109 B1 | 4/2004 | Wu |
| 6,813,148 B2 | 11/2004 | Hsu et al. |

(Continued)

FOREIGN PATENT DOCUMENTS

JP 2002133846 A 5/2002

OTHER PUBLICATIONS

International Search Report and Written Opinion, International Application No. PCT/US2010/055697, International Filing Date: Nov. 5, 2010, 11 pages.

*Primary Examiner* — Adrian S Wilson
(74) *Attorney, Agent, or Firm* — Haverstock & Owens LLP (57) ABSTRACT

An electronic component assembly and vibration reduction device having screwless design with cantilever clips to clam and locate the electronic panels onto the mounting brackets or fasten the information storage devices onto cases are disclosed. The cantilever clip contain damping structures, which can generate damping effect to reduce vibrations. The effectiveness of the damping structure can be adjusted through the adjustment of the length, thickness, materials and other factors of the cantilever clip. The damping effect is generated by moving the cantilever clips in an oscillatory manner.

11 Claims, 12 Drawing Sheets

(56) References Cited

U.S. PATENT DOCUMENTS

| | | | |
|---|---|---|---|
| 6,813,159 B2* | 11/2004 | Irie et al. | 361/752 |
| 6,859,357 B2* | 2/2005 | Morimoto et al. | 361/679.55 |
| 7,035,099 B2 | 4/2006 | Wu | |
| 7,036,783 B2 | 5/2006 | Chen et al. | |
| 7,075,783 B2* | 7/2006 | Jeong et al. | 361/679.21 |
| 7,079,380 B2 | 7/2006 | Wubs | |
| 7,085,131 B2* | 8/2006 | Peng et al. | 361/679.32 |
| 7,102,885 B2 | 9/2006 | Chen et al. | |
| 7,130,187 B1 | 10/2006 | Sun | |
| 7,142,419 B2 | 11/2006 | Cochrane | |
| 7,187,541 B2 | 3/2007 | Franke et al. | |
| 7,218,512 B2 | 5/2007 | Han | |
| 7,267,313 B2 | 9/2007 | Krzoska et al. | |
| 7,274,560 B2* | 9/2007 | Jeong et al. | 361/679.27 |
| 7,298,624 B2 | 11/2007 | Boswell | |
| 7,301,762 B2 | 11/2007 | Han | |
| 7,304,837 B2* | 12/2007 | Lo et al. | 361/679.27 |
| 7,352,569 B2 | 4/2008 | Muenzer et al. | |
| 7,379,294 B2 | 5/2008 | Chen | |
| 7,450,375 B2 | 11/2008 | Xu | |
| 7,463,490 B2* | 12/2008 | Kim et al. | 361/752 |
| 7,483,268 B1 | 1/2009 | King et al. | |
| 7,486,509 B2 | 2/2009 | Kim et al. | |
| 7,545,629 B1* | 6/2009 | Bauer et al. | 361/679.27 |
| 7,558,054 B1* | 7/2009 | Prest et al. | 361/679.3 |
| 7,609,509 B2 | 10/2009 | Wu et al. | |
| 7,889,492 B2* | 2/2011 | Chen et al. | 361/679.36 |
| 2002/0043608 A1* | 4/2002 | Nakata et al. | 248/560 |
| 2002/0044416 A1* | 4/2002 | Harmon et al. | 361/685 |
| 2002/0044418 A1* | 4/2002 | Shih | 361/685 |
| 2002/0067592 A1* | 6/2002 | Horiuchi et al. | 361/685 |
| 2003/0035281 A1* | 2/2003 | Huang et al. | 361/801 |
| 2003/0046849 A1* | 3/2003 | Lin | 40/792 |
| 2003/0222555 A1 | 12/2003 | Mansueto | |
| 2004/0032711 A1* | 2/2004 | Kaczeus et al. | 361/685 |
| 2004/0052192 A1* | 3/2004 | Chen | 369/75.1 |
| 2004/0075978 A1 | 4/2004 | Chen et al. | |
| 2004/0105229 A1* | 6/2004 | Wang et al. | 361/685 |
| 2005/0036287 A2 | 2/2005 | Kosugi | |
| 2005/0039995 A1* | 2/2005 | Inoke et al. | 188/371 |
| 2005/0040306 A1 | 2/2005 | Chen et al. | |
| 2005/0087504 A1 | 4/2005 | Wu | |
| 2005/0094367 A1 | 5/2005 | Franke et al. | |
| 2005/0099767 A1 | 5/2005 | Wu | |
| 2005/0103729 A1 | 5/2005 | Chen et al. | |
| 2005/0237709 A1 | 10/2005 | Huang | |
| 2006/0023416 A1* | 2/2006 | Chen | 361/685 |
| 2006/0061954 A1* | 3/2006 | Lam | 361/685 |
| 2006/0158860 A1* | 7/2006 | Green et al. | 361/727 |
| 2007/0030639 A1* | 2/2007 | Ko | 361/685 |
| 2007/0086156 A1* | 4/2007 | Skinner | 361/685 |
| 2008/0019084 A1* | 1/2008 | Lee et al. | 361/679 |
| 2008/0037212 A1* | 2/2008 | Wang | 361/685 |
| 2008/0101006 A1* | 5/2008 | Tsorng et al. | 361/685 |
| 2008/0137281 A1* | 6/2008 | Chen et al. | 361/685 |
| 2008/0158810 A1* | 7/2008 | Liu et al. | 361/685 |
| 2008/0165487 A1* | 7/2008 | Tsorng et al. | 361/683 |
| 2008/0291618 A1* | 11/2008 | Sheng | 361/685 |
| 2008/0291619 A2 | 11/2008 | Fan et al. | |
| 2009/0073649 A1* | 3/2009 | Ikeda et al. | 361/679.35 |
| 2009/0279244 A1 | 11/2009 | Crippen et al. | |

* cited by examiner

Fig. 10 ated through the mounting screws cause undesirable discoloration and halo-effect on the display. Further, the stress generated by the screw can cause the panel glass to break, thereby physically and permanently damaging the electronic display.

APPARATUS FOR AND METHOD OF SCREWLESS ASSEMBLY AND ADJUSTABLE DAMPING STRUCTURE FOR PANEL STRESS RELIEF

FIELD OF THE INVENTION

The present invention relates to the field of electronic device component assembly and stress relief. More specifically, the present invention relates to screwless assembly for displays, such as Liquid Crystal Display (LCD), and Hard Disk Drive (HDD).

BACKGROUND OF THE INVENTION

The electronic display panel assembly traditionally relies on screws to fasten and mount the display panels to a support bracket. The screws generate stress around the mounting areas on the display panels. The stress generated through the mounting screws cause undesirable discoloration and halo-effect on the display. Further, the stress generated by the screw can cause the panel glass to break, thereby physically and permanently damaging the electronic display.

Moreover, the portability of the modern electronics drastically changes the ways how people use the electronics. More and more of the electronics are designed to be light weight and easy to be carried around, such as notebooks, laptops, PDAs, IPODs, and cell phones. The portability of the electronics increases the chance of the electronics to be dropped and to receive vibrations during traveling. Such droppings of and vibrations received by the electronics can cause damages to the expensive panel glass of the electronic display due to the breakage at the screw assembly part.

Similarly, HDDs are conventionally mounted to electronic systems using screws. Typically, such mountings are achieved by using threaded mounting screw holes matching with threaded bolts. Although some screwless assembly has been designed and proposed to replace the traditional screw-required assembly, few designs and devices also provide solutions to the vibration problems. The vibrations that generated from the spinning of the internal memory disks or moveable components can cause instability of the mounting/positioning of the HDDs. Further, the vibrations that transmit to the hosting electronic system can affect the operational stability of the HDDs and the hosting electronic system.

The instability of the mounting of the HDD on the hosting electronic system can lead to improper positioning of the HDD. The vibrations that are generated by the HDD and transmitted to the hosting electronic system can affect the performance of the other electronic devices that are installed within or coupled with the hosting electronic systems. For example, analytical instruments, such as atomic force microscope (AFM), require very high standards of environmental stability. If the storage components, such as HDD, of the electronic system generate vibrations which are transmitted to the electronic system, the vibrations can negatively interfere with the performance of the AFM. Further, the vibrations generated by the HDD can also affect the performance of the HDD itself. For example, the vibration can cause undesirable vertical movements of the spinning memory disks inside the HDD. The undesired vertical movements of the spinning memory disks can result in additional unwanted movements of the floating reading head, which increases the likelihood of damaging the floating reading head. Further, such undesired vertical movements of the spinning memory disks can change the air/fluid dynamics inside the HDD, which in turn can reduce the spinning speed of the memory disks.

SUMMARY OF THE INVENTION

Apparatuses for and methods of electronic component assembly and reducing vibration reducing are disclosed. The present disclosure is for screwless electronic component assembly designs having cantilever-clips to clam and position on the mounting brackets, cases, and accommodating slots or spaces on the electronic system and to absorb and reduce the vibrations caused by or received from the electronic components.

In one aspect of the present invention, an apparatus for an electronic component assembly and vibration reduction is disclosed. The apparatus for an electronic component assembly and vibration reduction comprises a support member providing support to the electronic component and a damping member removably coupled with the electronic component. The electronic component is removably mounted to the support member. The damping member provides means for vibration reduction.

In some embodiments, the damping member prevents the electronic component from detaching from the support member. In other embodiments, the damping member removably engages an aperture on the electronic component, thereby securing a position of the electronic component to the support member. The securing is achieved by removably clipping a protrusion of the damping member to the aperture of the electronic component, wherein the protrusion travels substantially perpendicular to the opening of the aperture when vibrations are received by the damping member. In some embodiments, the damping member comprises a locating member, wherein the locating member comprises a protrusion. In other embodiments, the damping member comprises a cantilever, wherein the cantilever performs an oscillatory movement to reduce vibrations received. In alternative embodiments, the damping member performs an oscillatory movement at a frequency different from the frequency of vibrations received, thereby reducing a chance of building up constructive waves by the vibrations received. In some embodiments, the damping member reduces vibrations received by the support member, thereby reducing the transference of the vibrations received by the support member to the electronic component.

In some embodiments, the means for reducing the vibrations prevents damage to the electronic component when vibrations are received. In other embodiments, the means for reducing the vibrations reduce the vibrations generated by the electronic component, thereby reducing the vibrations transferred from the electronic component to an electronic component host. In some embodiments, the length of the damping member is selected to reduce a predetermined range of vibrations.

In some embodiments, the surface area or the thickness of the damping member is selected to reduce a predetermined range of vibrations. In other embodiments, the material of the damping member is selected to reduce a predetermined range of vibrations.

In some embodiments, the electronic component comprises an electronic display. In other embodiments, the electronic component comprises LCD or LED (Light-emitting diode). In other embodiments, the electronic component comprises an information storage device. In alternative embodiments, the information storage device comprises Hard Disk Drive.

In some embodiments, the electronic component comprises a plurality of the damping members to jointly and independently reduce the vibration received by the support member. In some embodiments, the length, the weight, the thickness, the relative position to the electronic component, the numbers, or the combination thereof of the damping member is selected to reduce more than 50% of the vibrations received by the support member.

In another aspect of the present invention, a method of electronic component assembly and vibration reduction is disclosed. The method of electronic component assembly and vibration reduction comprises positioning an electronic component using a vibration reducing member and reducing a vibration by an oscillating movement of the vibration reducing member.

In some embodiments, positioning the electronic component comprises placing the electronic component between the vibration reduction member and a support member. In some embodiments, the support member is a case or bracket for electronic devices. In some embodiments, reducing the vibration comprises moving the vibration reducing member having an energy phase different from an energy phase of the vibration. In other embodiments, reducing a vibration comprises moving the vibration reducing member in a frequency different from a frequency of the vibration.

In some embodiments, the electronic component comprises an electronic display or an information storage device. In some embodiments, the vibration reducing member removably engaged the electronic component.

In some embodiments, the method further comprises securing the electronic component using a protrusion on the vibration reducing member. In some embodiments, the method comprises generating damping effect to reduce a vibration.

In an alternative aspect of the present invention, an apparatus for electronic display enclosure is disclosed. The apparatus for electronic display enclosure comprises a first support member coupled to a first elongated member forming a first aperture allowing a first end of an electronic display to fit in between the first support member and the first elongated member. A second support member is coupled to a second elongated member forming a second aperture allowing a second end of the electronic display to fit in between the second support member and the second elongated member. The first support member and the second support member jointly provide sufficient support to prevent the electronic display detaching from the first or the second support member. A first vibration reducing member mechanically is coupled with the first elongated member. The vibration reducing member reduce vibrations when received.

In some embodiments, the first elongated member comprises a second vibration reducing member. In other embodiments, the second elongated member comprises at least one vibration reducing member. In some embodiments, the first and the second vibration reducing members jointly reduce substantially all of the vibrations received by the first support member. In some embodiments, the first support member couples with the proximal end of the electronic device and the second support member couples with the distal end of the electronic device. In some embodiments, the first and the second vibration reducing members of the first and the second support members move substantially perpendicularly to the surface of the widest side of the electronic component. In some embodiments, the support members and the vibration reducing members form a slot allowing the electronic component to fit therein. In other embodiments, the first support member comprises a first protrusion and the second support member comprises a second protrusion, wherein the first protrusion position the first support member and the second protrusion position the second support member to the electronic component.

In another alternative aspect of the present invention, an electronic display assembly is disclosed. The electronic display assembly comprises a first support member. The first support member is contains at least two vibration reducing members. The first vibration reducing member is located at the distal end of the first support member. The second vibration reducing member is located at the proximal end of the first support member. The first and the second vibration reducing members jointly attach to the first support member at the proximal end of the electronic display and a second support member. The second support member contains at least two vibration reducing members. The first vibration reducing member is located at the distal end of the second support member and the second vibration reducing member is located at the proximal end of the second support member. The first and the second vibration reduction members jointly attach to the second support member at the distal end of the electronic display.

In some embodiments, the assembly further comprises a connecting member, wherein the connecting member couples to the first support member and the second support member, thereby forming a slot allowing the electronic display to fit therein. In some embodiments, the assembly comprises a third vibration reducing members on the first support member located between the first and the second vibration reducing member on the first support member and a third vibration reducing member on the second support member located between the first and the second vibration reducing members on the second support member.

DETAILED DESCRIPTION OF THE INVENTION

Figure 1:
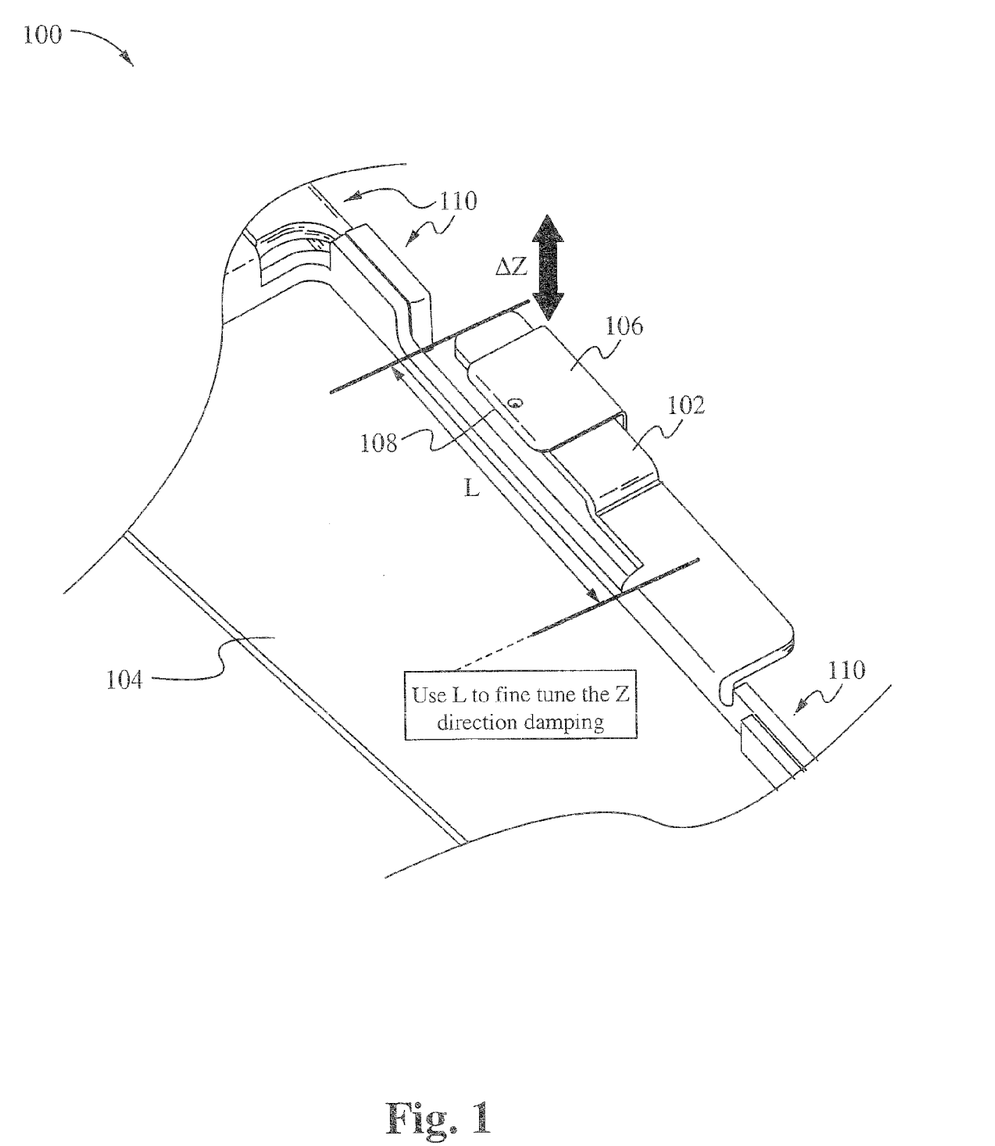
FIG. 1 shows a graphic illustration of one embodiment 100 in accordance with the principles of the present disclosure.

FIG. 1 shows a graphic illustration of one embodiment of the screwless and adjustable damping structure 100 in accordance with the principles of the present disclosure.

In some embodiments, the apparatus 100 includes a base 104, a cantilever 102, and/or wall structures 110. The base 104 is configured to be the support of the weight or structure of the electronic components, such as LCD panels, LED components, and HDDs. In some embodiments, the base 104 can be part or all of a LCD/HDD installation bracket, enclosure, case, or the equivalents thereof. A person skilled in the art would appreciate that the base 104 can contain the cantilever structure 102, the wall 110, or anything that can be part of the electronic components enclosure.

In some embodiments, the apparatus 100 can contain walls 110. The walls 110 can provide horizontal and/or vertical support to the electronic components enclosed. The walls 110 can also provide impact protections preventing and absorbing impact forces from all directions. For example, the walls can provide an impact force cushion when the electronic components fall. The walls 110 can also be part of the base 104 and/or part of the cantilever structure 102. In some embodiments, the walls 110 can be placed on at least two sides of the electronic components. In some embodiments, two sets of walls 110 with two sets of bases 104 are placed across the opposite side of the electronic component enclosed, thereby forming an enclosure to the electronic components. In some embodiments, two sets of walls and one base 104 form the enclosure to the electronic components. In this case, the base can be extended from one set of the walls 110 coupling to the other set of walls 110 located at the other side of the electronic components.

In some embodiments, the cantilever structure 102 contains a locator 106. The locator 106 can contain a protrusion 108 pointing toward the electronic components. The protrusion on the locator 106 clips in a hole or aperture on the electronic components, so the apparatus 100 can be fixed to the electronic components. A person skilled in the art would appreciate that the aperture on the electronic component and the protrusion of the locator can be interchanged and are optional, so the cantilever structure 102 can directly attach or engage on the electronic components. The apparatus 100 can be attached to the electronic components in various ways, including mechanical (such as sandwiched), physical (such as frictionally), and chemical (such as glue on) attachments.

In some embodiments, the cantilever structure 102 can be configured to generate a mechanical damping effect to reduce or cancel the vibrations generated from or received by the electronic components, the base 104, the walls 110, the cantilever structure 102 or combinations thereof. The effectiveness of the damping effects or vibration reduction can be adjusted by varying the length, width, thickness, weight, patterns, or materials of the cantilever structures. For example, the effectiveness of the damping effects or vibration reduction can be designed based on the weight of the electronic devices or particular components or parts of the electronic devices. Further, other factors or features of the electronic devices are also able to be considered in the design of generating damping effects and vibration reduction, such as the shape and stereo-geometry of the electronic devices. The term damping effect used here also extends to any other effects or devices that can reduce or used to reduce vibrations generated or received. Accordingly, the term damping effect is used interchangeably with the term vibration reducing effect, and the term cantilever structure is used interchangeably with any structures that can reduce or be used to reduce the vibrations. A person skilled in the art would appreciate that the vibration reducing effect can also be extended to counter rotation or any other physical movements that a person skilled in the art would deem proper.

In some embodiments, the damping effect can be generated by an elongated member or a cantilever bar, which is illustrated as the cantilever structure 102 of FIG. 1. In some embodiments, the damping effect is generated by allowing the cantilever structure 102 oscillating along the z-axis respective to the body of the electronic components or the base 104, which is presumed to be in the x-y plane. A person skilled in the art would appreciate that the damping effect (vibration reducing effect) can also be effective in any direction, such as y-axis, z-axis, and the combinations of x, y, and z axises. Further, the vibration reducing effect can also be generated by making the cantilever structures moving in a rotational manner. Moreover, the vibration reducing effect can also be generated by using the physical and material properties of the cantilever structure 102. For example, the softness and the rigidity of the cantilever structure 102 can be used to absorb the vibrations.

Figure 2:
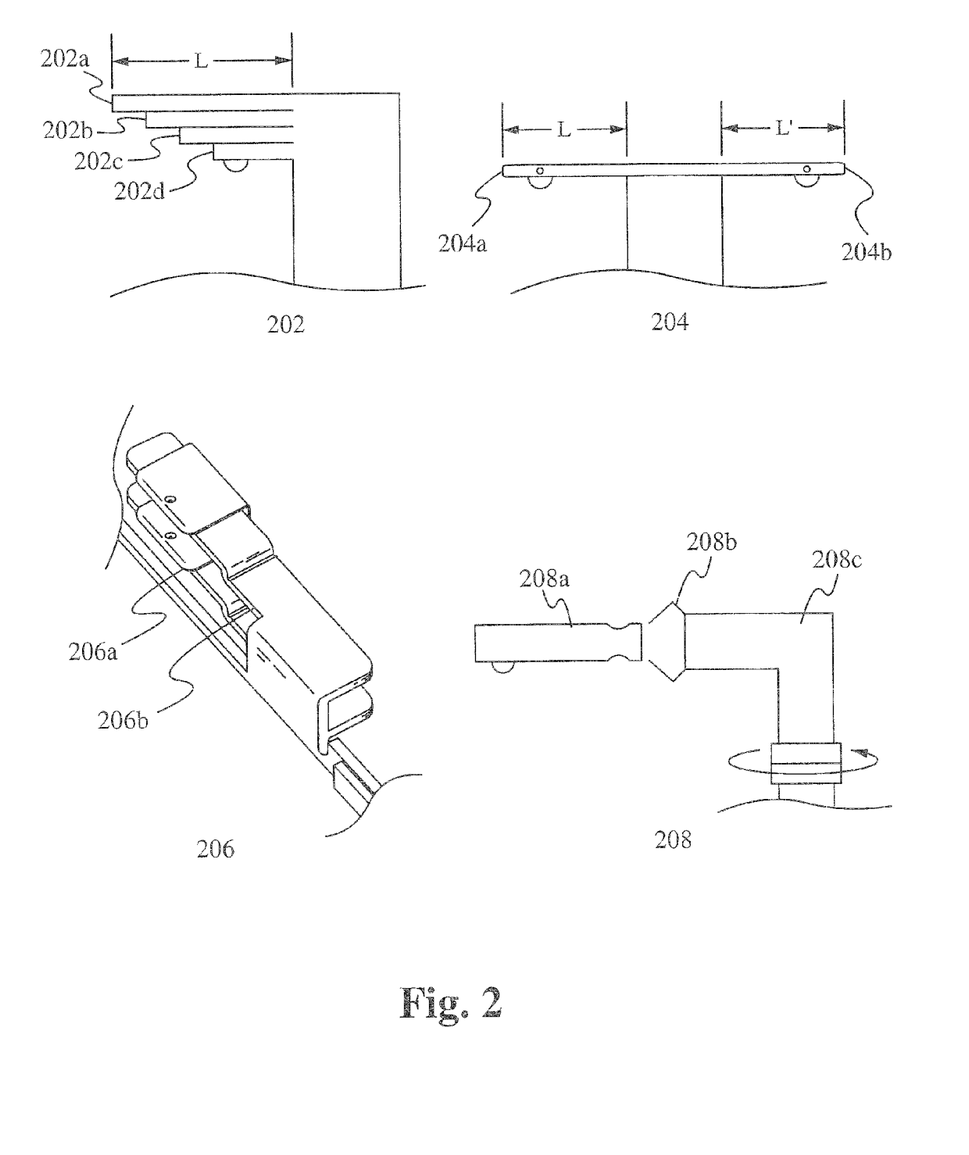
FIG. 2 shows a graphic illustration of some embodiments of the cantilever structure 102 in accordance with the principles of the present disclosure.

FIG. 2 shows a graphic illustration of some embodiments of the cantilever structure 102 in accordance with the principles of the present disclosure.

In some embodiments, the cantilever structure 102 can be configured in various patterns and structures to generate effective damping effect to reduce or cancel the vibrations generated or received by the electronic components. For example, the multi-finger structure 202 of the cantilever structure 102 has various lengths of the "fingers" 202a, 202b, 202c, and 202d. The finger 202a is longer than the fingers 202b, 202c, and 202d. The different lengths of the fingers generate effective damping effect to reduce vibrations of different frequencies. A person skilled in the art would appreciate that the numbers, the shapes, the length, and the thickness of the fingers are variable. The fingers are able to attach to each other directly. Alternatively, the fingers are able to have some spaces between each other. Additionally, if some spaces exist between the fingers, the space can be designed in a shape, dimension, or structure that can assist the reduction of vibrations of the fingers.

In some embodiments, the cantilever can be two prongs structure 204 pointing at different directions. The length L of the first prong 204a can be either the same or different from the length L' of the second prong. A person skilled in the art would appreciate that the patterns, structures, colors, materials, and the thickness of the first prong and the second prong can be either the same or different. Further, the directions of the first prong 204a and second prong 204b can be designed to point at the directions that can more effectively reduce the vibrations. Moreover, the first prong 204a and the second prong 204b can be designed to reduce different types, frequencies, and different sources of the vibrations. For example, the first prong 204a can be designed to reduce the vibrations generated from the internal rotation of the hard disk drive enclosed by the apparatus 100. The second prong 204b can be designed to reduce the shock waves received by the base structures 104 (FIG. 1).

Alternatively, the cantilever structure 102 can be designed to effectively reduce vibrations by having two decks 206 made by different materials. For example, the first deck 206a can be made of steel and the second deck 206b can be made of plastics, polymers, foam, or rubbers. The first deck 206 that is made of steel has higher rigidity providing better damping response to reduce the majority of the vibrational waves. The second deck 206b that is made of plastics, polymers, foam or rubbers material constitutes a softer material, which can respond to the vibrational wave quicker. The first deck 206a and the second deck 206b can work independently or jointly. The first deck 206a can first respond to the vibrations received from the electronic components enclosed, and the second deck 206b subsequently removes the vibrational waves from the first deck 206a. In some embodiments, the first deck 206a is made of same material as the second deck of 106b.

In some embodiments, the cantilever structure 102 contains a detachable head 208a. The detachable head 208a can be installed on the handle unit 208c through the adaptor 208b. The detachable head 208a can be screwed into the thread of the adaptor 208b. Alternatively, the detachable head 208a can be hooked on the trench on the 208a by the teeth of the adaptor 208b. A person skilled in the art would appreciate that the detachable head 208a can be attached to the handle unit 208c in various ways. Further, the detachable head is able to be made by various materials and designed to have various lengths, thickness, and patterns.

Figure 3:
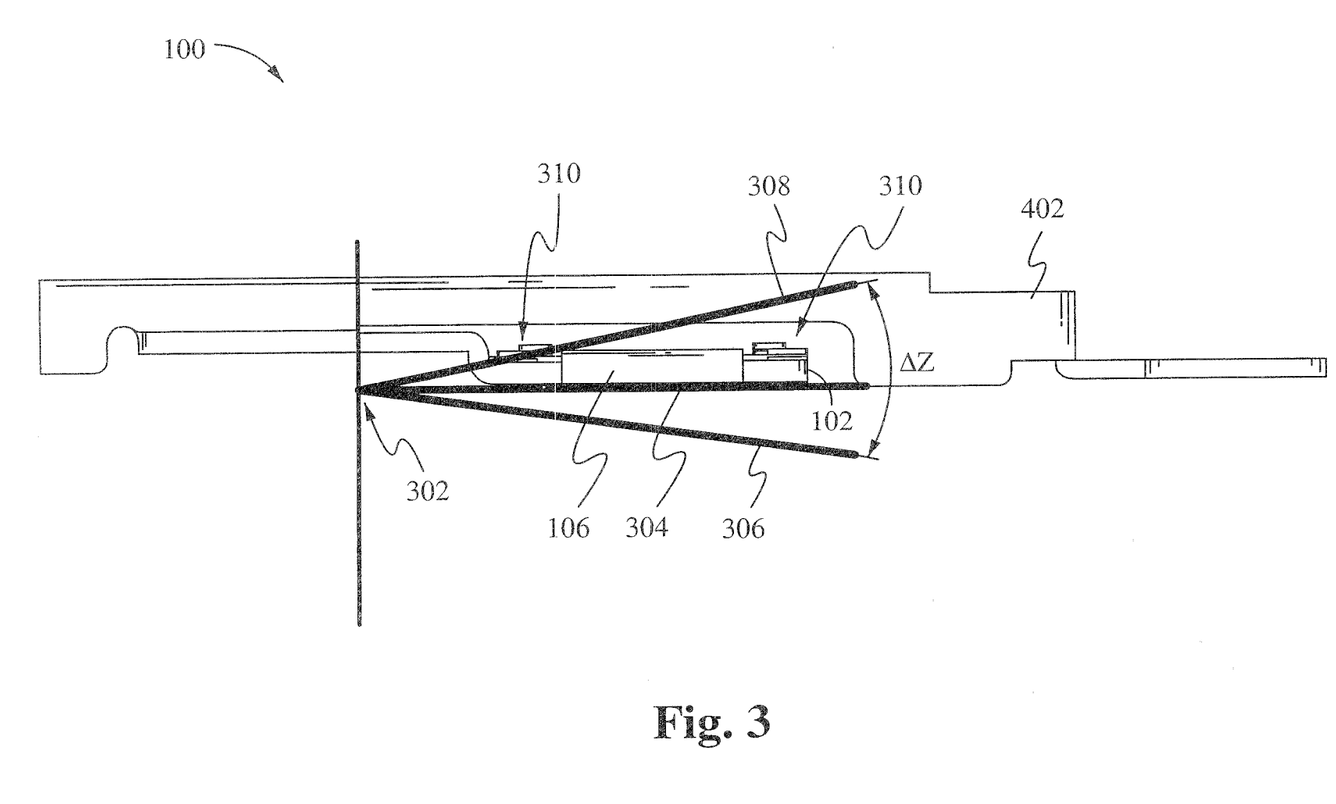
FIG. 3 shows a graphic illustration of one embodiment of the cantilever structure 102 performing the damping effect in accordance with the principles of the present disclosure.

FIG. 3 shows a graphic illustration of some embodiments of the cantilever structure 102 performing the damping effect in accordance with the principles of the present disclosure.

In some embodiments, the cantilever structure 102 generates damping effects to reduce the vibrations. The damping effect of the cantilever structure 102 can be generated by having the cantilever structure 102 performing oscillating movements in response to vibrations which are received. The oscillating movements of the cantilever structure 102 can be moving substantially along the z-axis. As illustrated in FIG. 3, the cantilever structure 102 can generate damping effect by moving along the non-moving part of the center point 302 (rotational axis) from the high position 308 to middle position 304 and then to the low position 306. Next, the cantilever structure 102 moves back from the low position 306 to middle position 304 and then to high position 308. The repetitions of the oscillating moving process between the positions of high 308 and low 306 remove or decrease the vibrations received by the apparatus 100.

Figure 4:
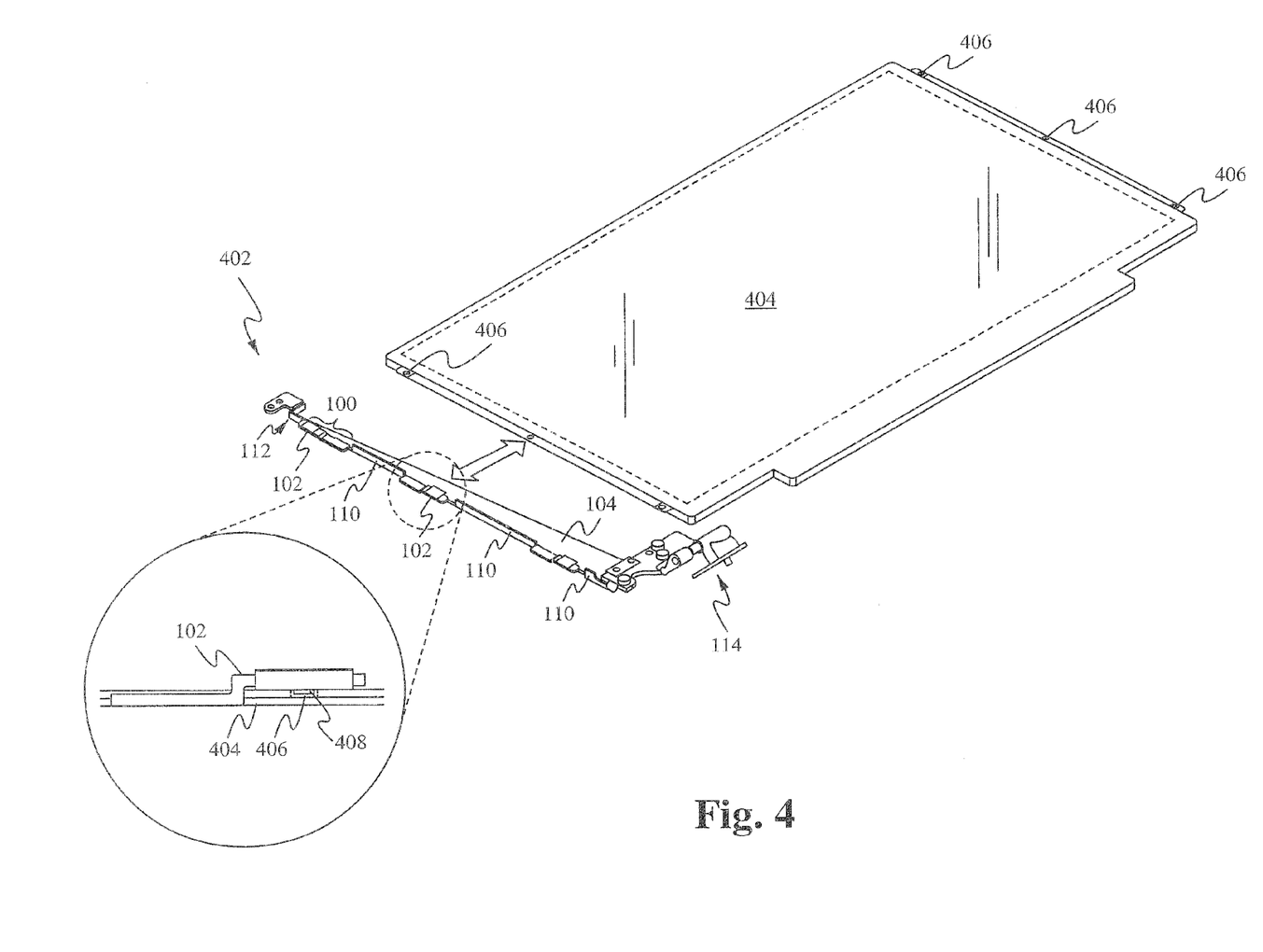
FIG. 4 shows a graphic illustration of some embodiments of the display panel applications in accordance with the principles of the present disclosure.

In some embodiments, the apparatus 100 contains cantilever structures 102 (damping structures or vibration reducing devices). The cantilever structure 102 contains a locator 106, which can be formed of a metal sheet broader than the cantilever structure 102. The locator 106 and/or the cantilever structure 102 contains at least one protrusion 310. The protrusion 310 is configured to clip on and/or fasten the bracket 402 to electronic component 404 (FIG. 4). The protrusion is able to be any of a variety of thicknesses, shapes, weights, and/or materials.

FIG. 4 shows a graphic illustration of some embodiments of the applications in accordance with the principles of the present disclosure.

In some embodiments, the screwless assembly and adjustable damping structures can be incorporated on a bracket or case 402. The bracket or case 402 can be a bracket for installing and fixing electronic components, such as LCD panel, LED panel, and HDD. The bracket 402 can include the base 104, the wall 110, and the cantilever structure 102. The term cantilever structure 102 is used interchangeably with the term damping structure. The cantilever structure 102 can attach to, clip on, or fix on the aperture 406 of the electronic component 404. The bracket 402 can be attached/clipped on the aperture 406 of the electronic component 404 by using the protrusion 408 on the cantilever structure 102 or the clip 106. The bracket 402 can contain an upper corner wall 112 and a lower corner wall 114. The upper corner wall 112, the lower corner 114, and the base 104 can provide support to the enclosed electronic component 404. The cantilever structure 102 clips on the electronic component 404 to ensure that the bracket 402 stays on the electronic component 404. By having two brackets 402, the electronic component 404 can be positioned in a stand-up manner. Alternatively, the base 104 can extend across the electronic component 404. The base 104 can have two apparatus 100 (including the cantilever structure 102). One of the apparatus 100 can fix one side of the electronic component 404 and the other apparatus 100 can fix the opposite side of the electronic component 404, thereby providing sufficient support and fixation to make the electronic component 404 capable of being installed in a standing up manner.

Figure 5:
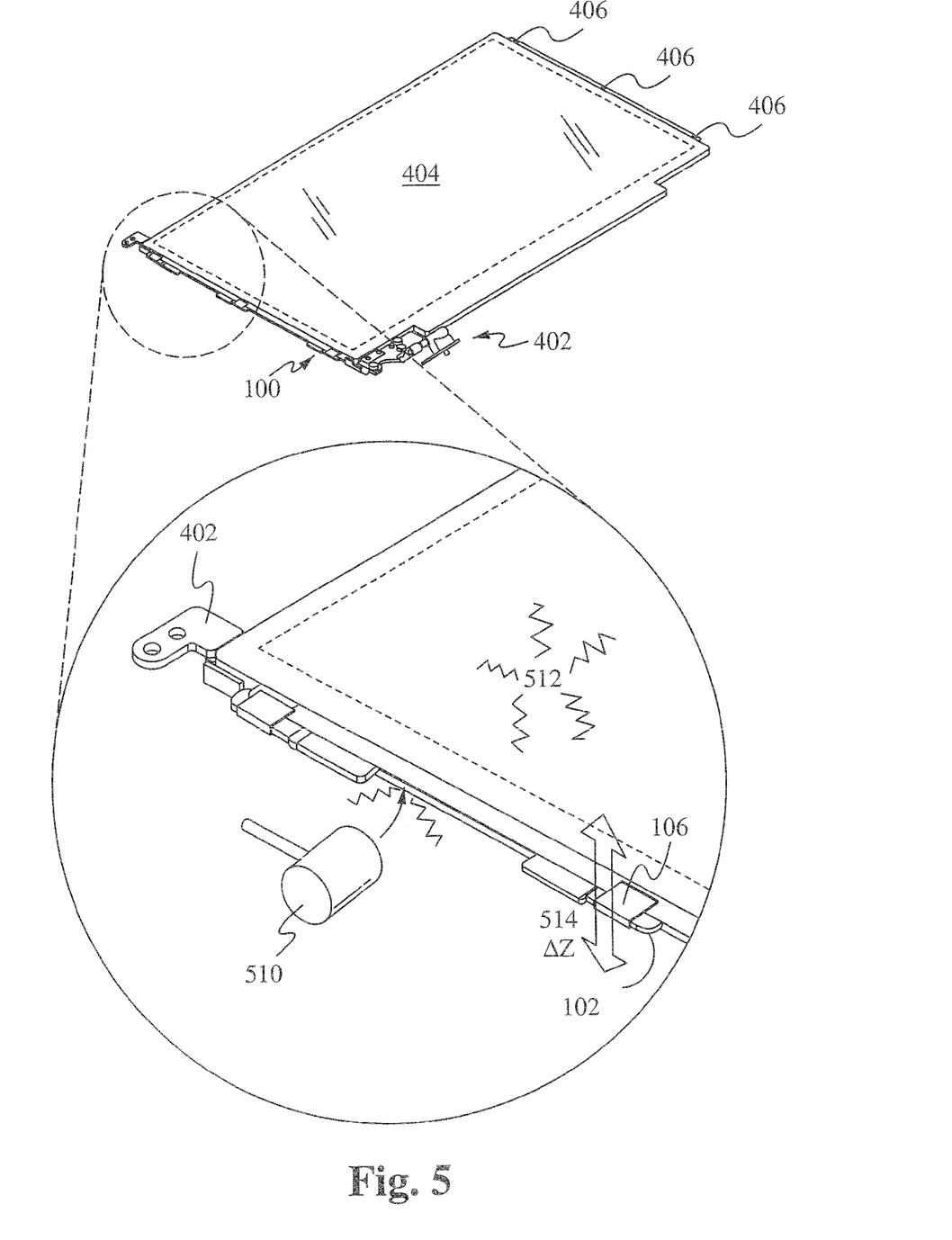
FIG. 5 shows a graphic illustration of some embodiments that the bracket 402 fastened on the electronic device 404 in accordance with the principles of the present disclosure.

FIG. 5 shows a graphic illustration of some embodiments that the bracket 402 fastened on the electronic device 404 in accordance with the principles of the present disclosure.

As shown in the FIG. 5, the bracket 402 contains three apparatus 100. The apparatus 100 contains the cantilever structure 102, which has a locator clip 106 attached. The locator clip 106 contains at least one protrusion 310, 408. The protrusion 310, 408 clips on the aperture 406 of the electronic component 404, to thereby fasten or fix the bracket 402 onto the electronic component 404.

The apparatus 100 is able to effectively reduce both the external vibrations 510 received and the internally generated vibrations 512. The apparatus 100 contain method of, apparatus for, and means for reducing vibrations. When the externally applied vibrations 510 and/or internally generated vibrations 512 transmit to the device 100, the vibrations induce the cantilever structure 102 (the vibration reducing apparatus 100) to generate damping effect, which reduces the vibrations. The damping effect is able to be generated by making the cantilever structure 102 moving oscillatory substantially parallel to the z-axis 514.

Figure 6A:
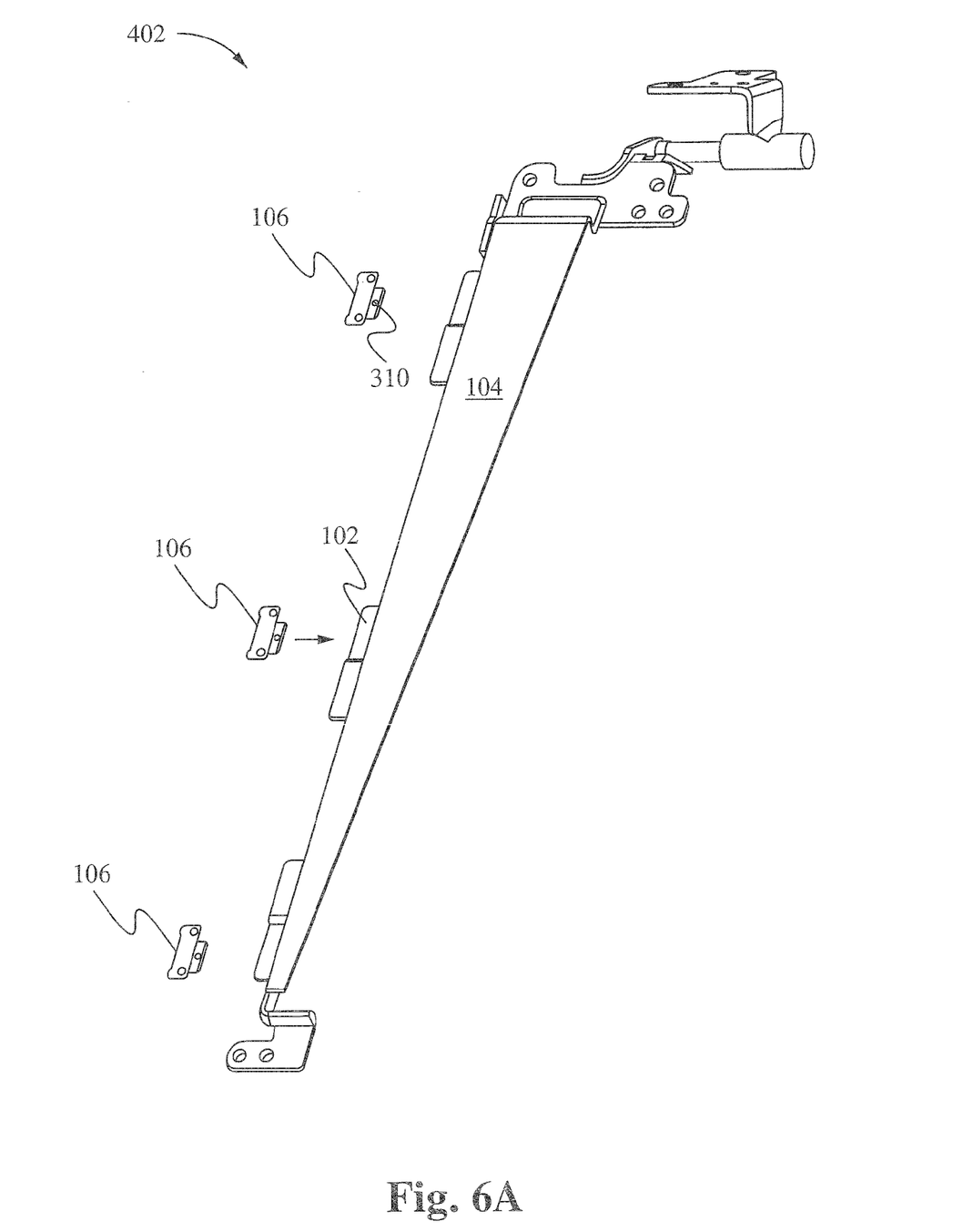
FIGS. 6A, 6B, and 6C show graphic illustrations of various views of the bracket 402 in accordance with the principles of the present disclosure.
Figure 6B:
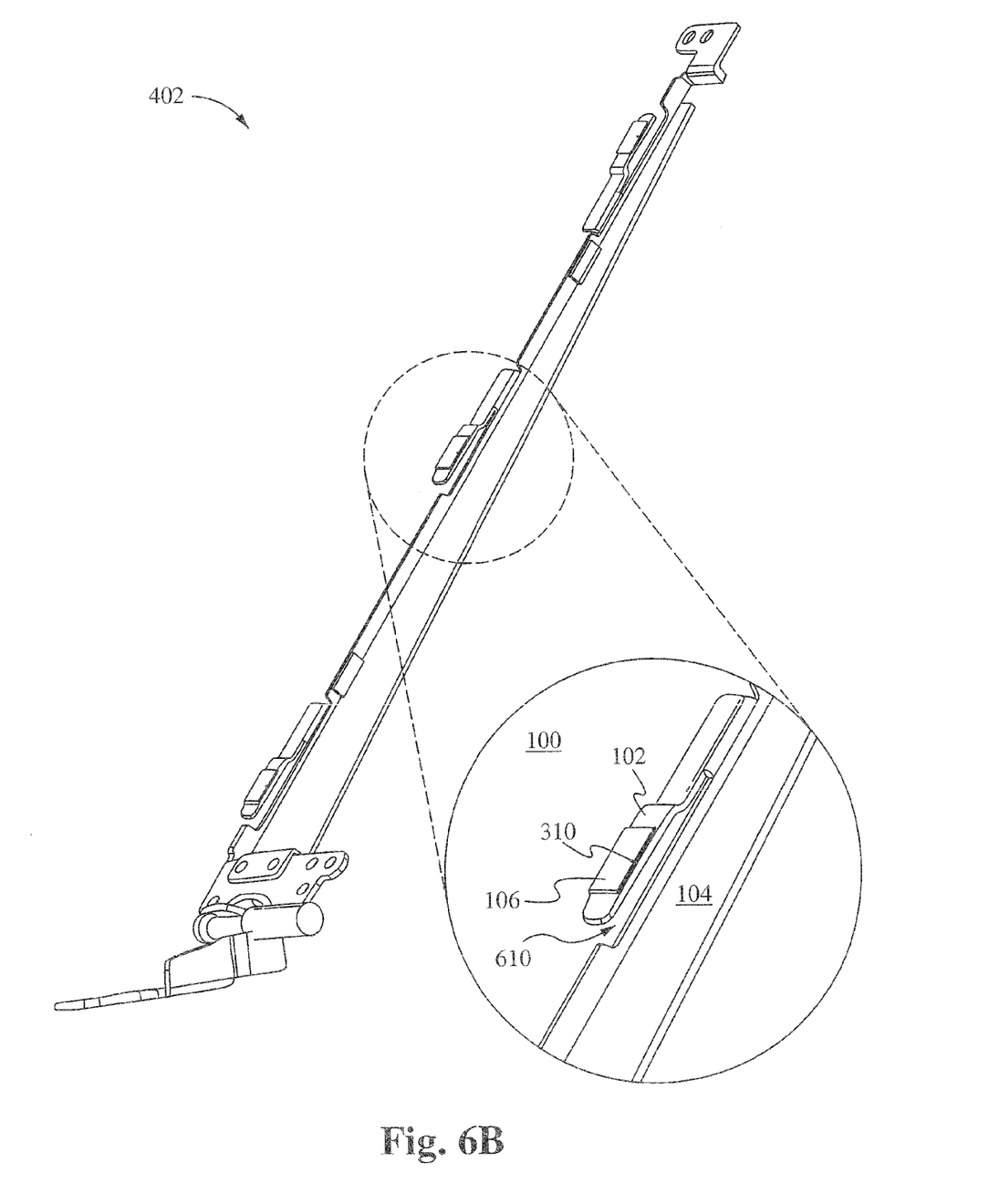
Figure 6C:
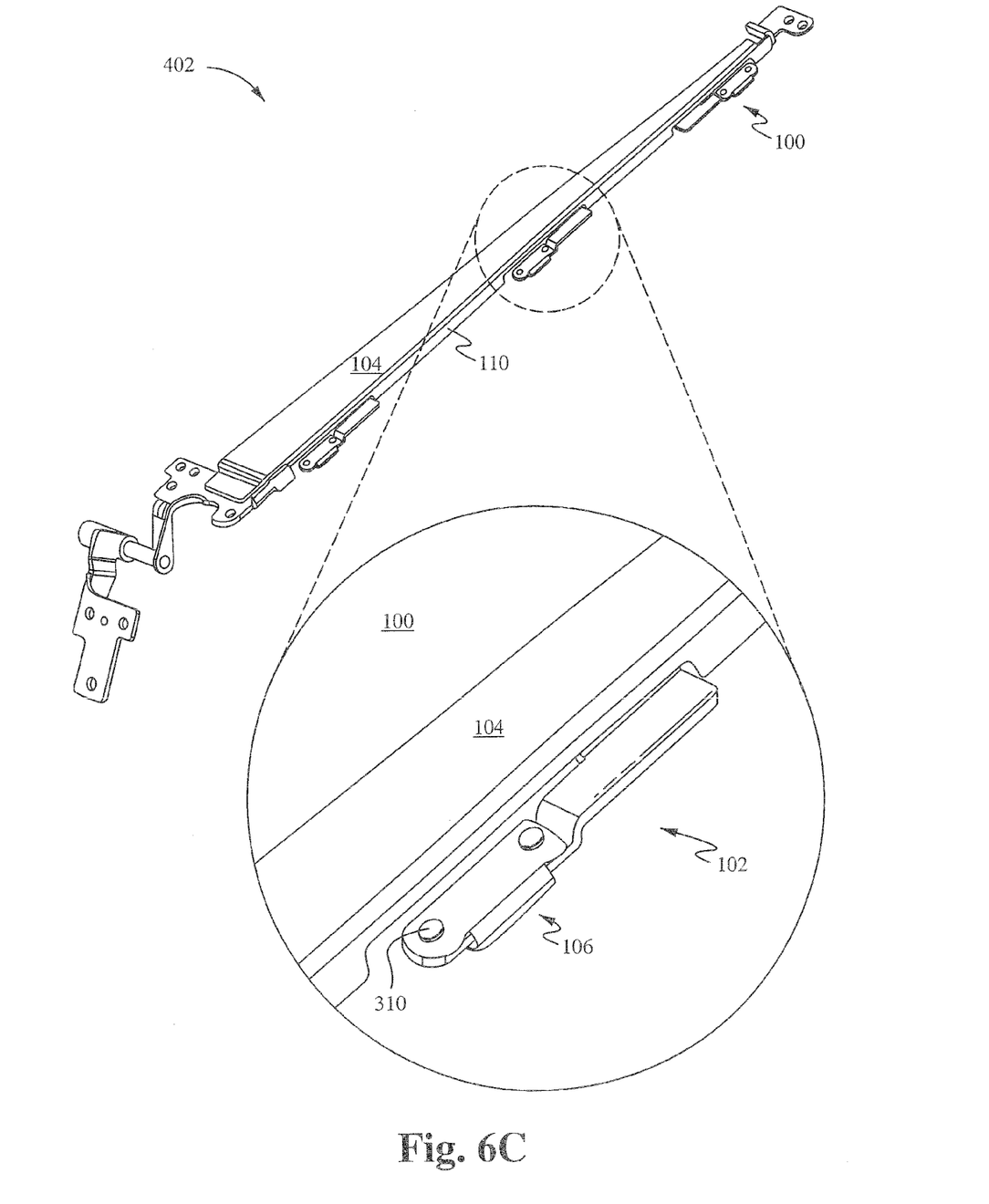

FIGS. 6A, 6B, and 6C show graphic illustrations of various views of the bracket 402 in accordance with the principles of the present disclosure.

As illustrated in FIG. 6A, the bracket 402 contains the base 104, the cantilever structure 102, and the locator 106. The locator 106 is able to be C-ring type of clips. Further, the locator 106 can contain the protrusion 310. The locator 106 can be attached to the bracket 402 by protrusion/recess attachment, glue on, screw on, and any other methods that a person skilled in the art would deem proper.

As illustrated in FIG. 6B, the apparatus 100 has the cantilever structure 102. The cantilever structure 102 contains the locator 106 having a protrusion 310. The locator 106 is wider than the cantilever structure 102. As such, the locator 106 is able to clip on the electronic component 404.

The contour of the base 104 as well as the space 610 between the cantilever structure 102 and the base 104 allows the cantilever structure to move oscillatory generating the damping effects. Further, the space 610 allows the bracket 402 to receive the electronic component 404.

As illustrated in FIG. 6C, the apparatus 100 contains the cantilever structure 102, the base 104, and the locator 106 with the protrusion 310. The locator 106 is wider than the cantilever structure 102. The locator extends underneath the base 104. The overlapping of the clip 106 and the base 104 allows the protrusion 310 to mechanically couple with the electronic component 404, which is enclosed within the walls 110.

Figure 7:
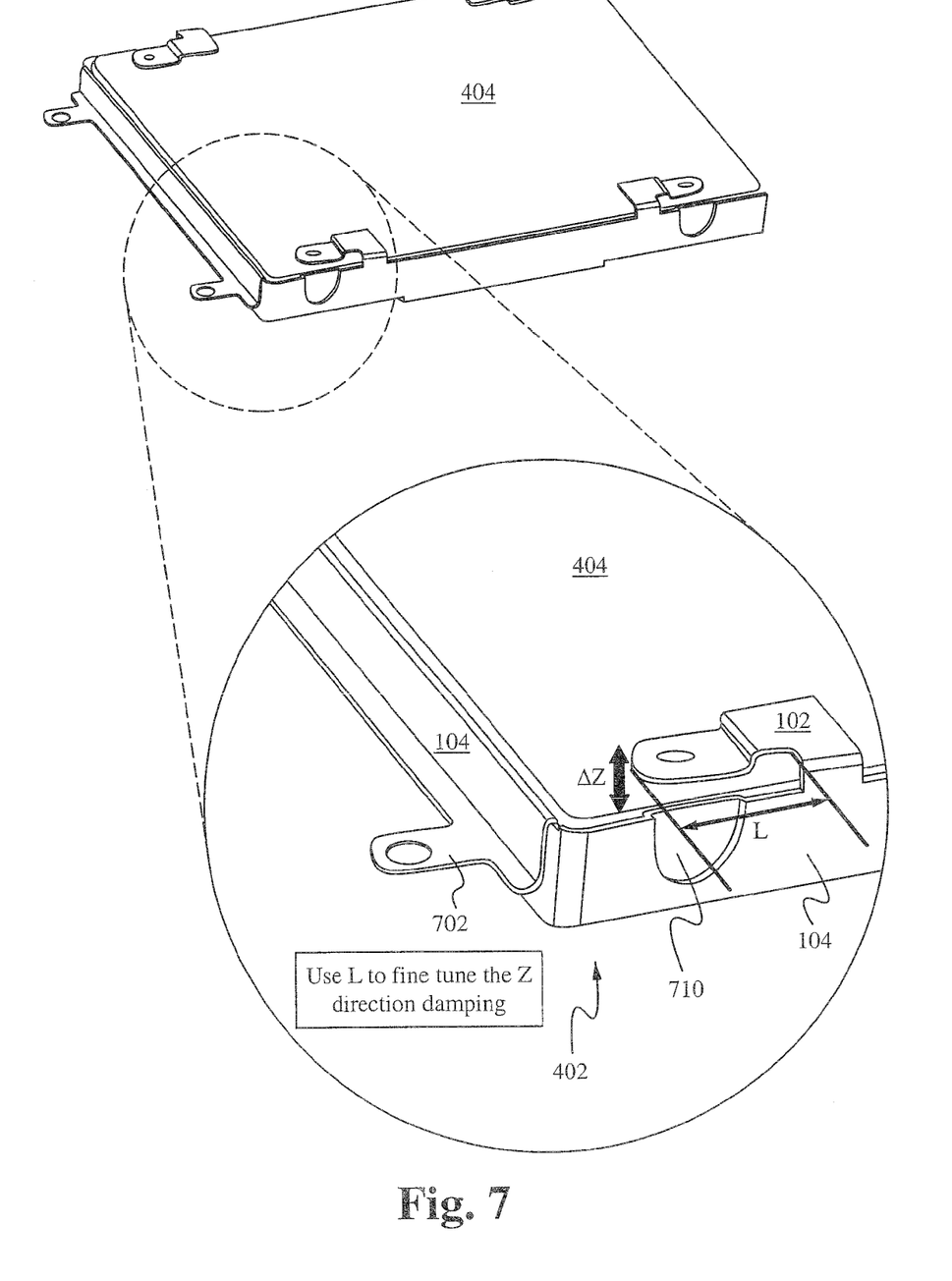
FIG. 7 shows a graphic illustration of a HDD application in accordance with the principles of the present disclosure.

FIG. 7 shows a graphic illustration of an application to mount to a HDD in accordance with the principles of the present disclosure.

Similar to what has been disclosed above, the apparatus 100 is able to contain the base 104, and the cantilever structure 102. Further the apparatus 100 is able to contain a contour protruded toward the electronic component 404 (HDD) for having a better contact with the electronic component 404 and also have better vibration transfer efficiency. The vibrations generated from the HDD travel to the contact point 710. Next, the vibrations travel to the base 104 and then to the cantilever structure 102, which generates damping effect to reduce the vibrations.

The HDD bracket 402 can contain a hanger 702, which can be used to attach to an electronic hosting system, such as a server or a personal computer (not shown).

Figure 8:
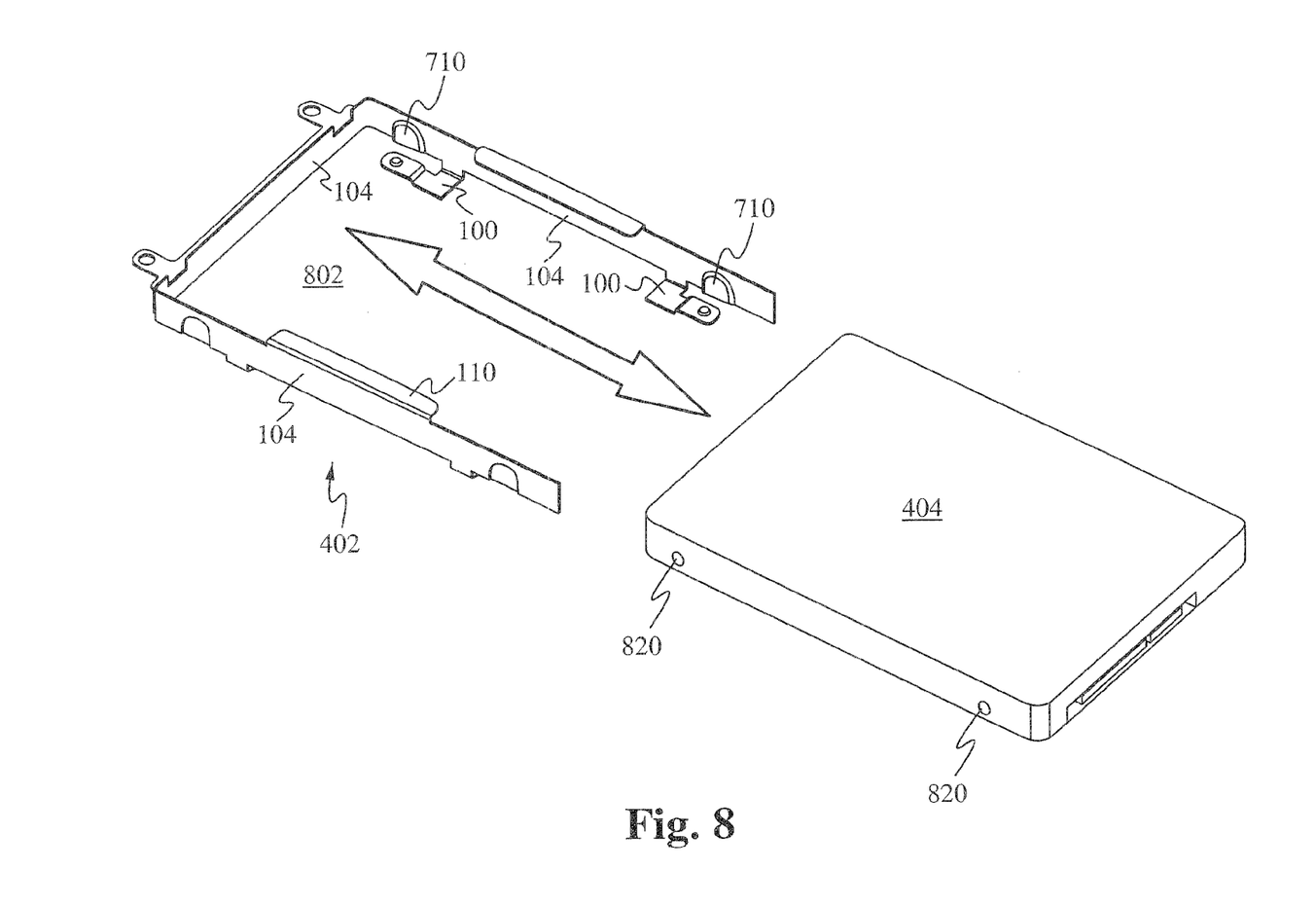
FIG. 8 shows a graphic illustration of the installation of the electronic component 404 to the bracket 402 in accordance with the principles of the present disclosure.

FIG. 8 shows a graphic illustration of the installation of the electronic component 404 to the bracket 402 in accordance with the principles of the present disclosure.

The base 104 can contain at least one apparatus 100 and walls 110. The installation of the HDD (electronic component 404) can be achieved by sliding the electronic component 404 into the slot or aperture 802 formed by the bracket 402. The term bracket 402 used in this document is interchangeable with the terms of frame, case, skeleton, bar, or any other structures that can be used as support or an interface between the electronic component enclosed and the electronic hosting systems, such as servers and personal computers. The bracket 402 is able to contain at least one wall 110, at least one base 104, and at least one apparatus 100. In some embodiments, the bracket 402 contains contact points 710 to engage holes 820 for fixing the bracket 402 to the electronic component 404. The above mentioned components (walls 110, base 104, apparatus 100) jointly and optionally selected to be used for forming the frame, slot, or the bracket 402 for receiving and assembling the electronic component 404 without using a screw. The screwless assembly with the vibration reducing apparatus 100 constitutes one of the novel methods of and apparatus for electronic component assembly and vibration reducing device that cannot be easily achieved by the person skilled in the art in view of the currently available technology.

Figure 9:
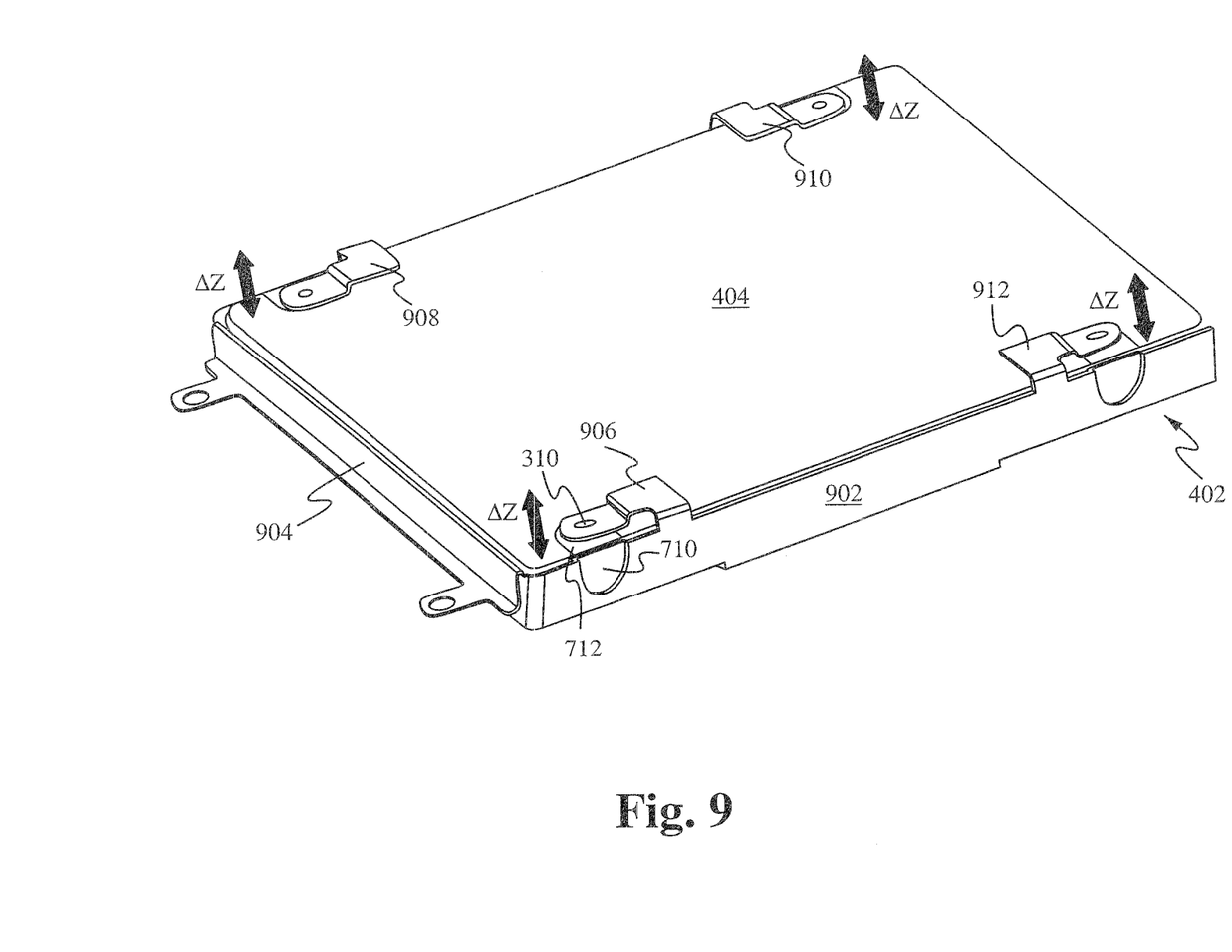
FIG. 9 shows a graphic illustration of the installed electronic component 404 with the bracket 402 in accordance with the principles of the present disclosure.

FIG. 9 shows a graphic illustration of the installed electronic component 404 with the bracket 402 in accordance with the principles of the present disclosure.

As shown in the FIG. 9, the bracket 402 can include side frames 902 and 904. The side frames 902 and 904 can be independently removable iron containing steel bars. The side frame 902 can be solid bars and the side frame 904 can be C-shape bars. The side frame 902 is connected with the side frame 904 by inserting the solid bar 902 into the space of the C-shape bar 904. The connections and relative positions between the side frame 902 and side frame 904 are maintained by the friction between the side frames 902 and 904.

The position of the bracket 402 installed on the electronic component 404 is maintained using the protrusion 310 to receive the recess or the aperture 406 (not shown in FIG. 9) on the electronic components. Alternatively, the position of the bracket 402 relative to the electronic component 404 is maintained by the contact point 710, which can be a bulging part of the contours of the side frame. The contact point 710 can insert into the aperture or recess 712 of the electronic component 404.

In some embodiments, the bracket 402 can contain multiple assembly and vibration reducing apparatus 100 including devices 906, 908, 910, and 912. The devices 906, 908, 910, and 912 can fix the relative positions of the electronic component 404 and also provide the function of vibration reductions or eliminations. The devices 906, 908, 910, and 912 can work jointly. For example, if the electronic component 404 generates vibrations in a range of frequencies, the devices 906, 908, 910, and 912 can be designed to reduce specific range of the vibration frequencies, such as the device 906 is specifically designed to reduce the lowest quarter portion of the frequencies generated by the electronic component 404 and the device 908 is designed to reduce a quarter range of the frequencies immediately follow the frequencies absorbed by the device 906. Alternatively, the devices 906, 908, 910, and 912 can be designed to reduce the vibrations at different locations of the electronic components 404. For example, the device 906 can be designed to reduce the vibrations at the right down portions of the electronic component 404 and the device 912 can be designed to absorb the vibrations near the right top portions of the electronic device. Further, the device 906 (apparatus 100) can be designed specifically at the location that can be most effectively reduce the vibration of the electronic component 404. For example, if most of the vibrations are generated at the center of the electronic component 404, the device 906 (apparatus 100) can be also designed to be placed near the center of the electronic component 404. Further, a contact point can be designed to be near where an apparatus 100 is located for effective vibration transmission to the vibration reduction apparatus 100.

In some embodiments, the 906, 908, 910, and 912 can work independently. Accordingly, each of the devices 906, 908, 910, and 912 can independently perform the function of vibration reduction.

Figure 10:
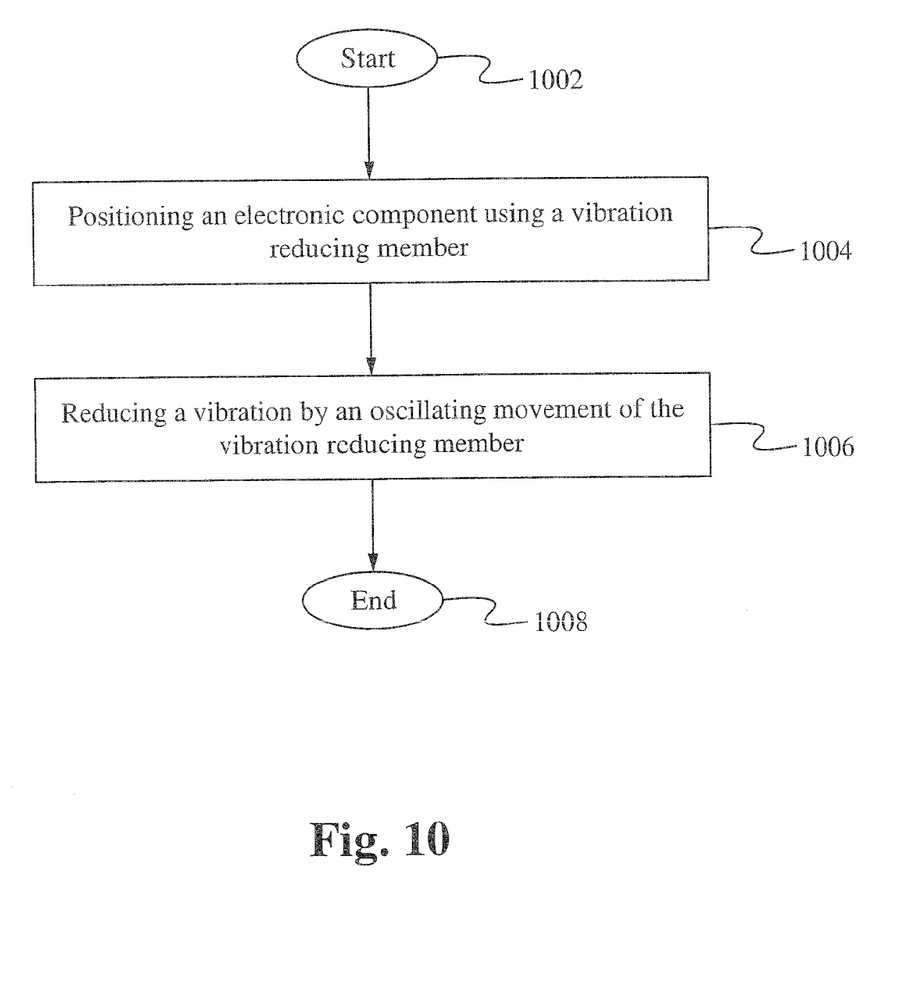
FIG. 10 is a flow chart illustrating one embodiment of the methods of electronic component assembly and vibration reduction in accordance with the principles of the present invention.

FIG. 10 is a flow chart illustrating one embodiment of the method of electronic component assembly and vibration reduction in accordance with the principles of the present invention.

The method of electronic component assembly and vibration reduction includes the following steps. The method begins from Step 1002. At Step 1004, an electronic component is positioned using a vibration reducing member. At Step 1006, a vibration is reduced by an oscillating movement of the vibration reducing member. The method ends at Step 1008. A person skilled in the art would appreciate that additional steps can be added and not all the steps are required.

The screwless assembly apparatuses and methods described in the present application provide many advantageous features that traditional screw required assembly cannot offer. For example, the screwless assembly of the present invention provides efficiency and ease to electronic assembly and maintenance. Further, the damping features of the present invention provide functions to reduce and absorb vibrations.

The description of the present disclosure is presented to enable one of ordinary skill in the art to make and use the invention and is provided in the context of a patent application and its requirements. Various modifications to the described embodiments will be readily apparent to those persons skilled in the art and the generic principles herein may be applied to other embodiments. Thus, the present invention is not intended to be limited to the embodiment shown but is to be accorded the widest scope consistent with the principles and features described herein.

What is claimed is:

1. An apparatus for an electronic display enclosure comprising:
   a. a first support member coupled to a first elongated member forming a first aperture allowing a first end of an electronic display to fit between the first support member and the first elongated member;
   b. a second support member coupled to a second elongated member forming a second aperture allowing a second end of the electronic display to fit between the second support member and the second elongated member, wherein the first support member and the second support member jointly provide sufficient support to prevent the electronic display detaching from the first or the second support member; and c. a first vibration reducing member mechanically coupled with, and supported by, the first elongated member at a first end of the first vibration reducing member and a second end of the first vibration reducing member is unsupported, wherein the electronic display is removably fixedly coupled to the first vibration reducing member, and the first vibration reducing member reduces vibrations when received.

2. The apparatus of claim 1, wherein the first elongated member comprises a second vibration reducing member and the electronic display is screwlessly fixedly coupled to the second vibration reducing member.

3. The apparatus of claim 2, wherein the second elongated member comprises at least one vibration reducing member.

4. The apparatus of claim 3, wherein the first and the second vibration reduction members jointly reduce substantially all of the vibrations received by the first support member.

5. The apparatus of claim 1, wherein the first support member is coupled with the proximal end of the electronic device and the second support member is coupled with the distal end of the electronic device.

6. The apparatus of claim 3, wherein the vibration reducing members of the first and the second elongated members move substantially perpendicular to the surface of the widest side of the electronic component.

7. The apparatus of claim 2, wherein the support member and the vibration reducing members form a slot allowing the electronic component to fit in.

8. The apparatus of claim 7, wherein the first support member comprises a first protrusion and the second support member comprises a second protrusion, wherein the first protrusion positions the first support member and the second protrusion positions the second support member to the electronic component.

9. An electronic display assembly comprising:
  a. a first support member, wherein the first support member comprises first and second vibration reducing members, wherein the first vibration reducing member is located at a distal end of the first support member, the second vibration reducing member is located at a proximal end of the first support member, wherein a first end of each of the first and the second vibration reducing members jointly attach to the first support member at a proximal end of the electronic display, and a second end of each of the first and second vibration reducing members is unsupported; and
  b. a second support member, wherein the second support member comprises third and fourth vibration reducing members, wherein the third vibration reducing member is located at a distal end of the second support member and the fourth vibration reducing member is located at a proximal end of the second support member, wherein a first end of each of the third and the fourth vibration reduction members jointly attach to the second support member at a distal end of the electronic display, and a second end of each of the third and fourth vibration reducing members is unsupported, and;
  c. an electronic display removably fixedly coupled to the first and second vibration reducing members of the first support member and the third and fourth vibration reducing members of the second support member.

10. The assembly of claim 9 further comprises a connecting member, wherein the connecting member connects the first support member and the second support member, thereby forming a slot allowing the electronic display to fit in.

11. The assembly of claim 9 further comprises a fifth vibration reducing member on the first support member located between the first and the second vibration reducing members on the first support member and a sixth vibration reducing members on the second support member located between the third and the fourth vibration reducing member on the second support member.

* * * * *